(No Model.)

M. TURLEY.
NUT LOCK.

No. 282,688. Patented Aug. 7, 1883.

WITNESSES

INVENTOR
M. Turley.
By H. A. Seymour
Attorney

UNITED STATES PATENT OFFICE.

MARSHALL TURLEY, OF COUNCIL BLUFFS, IOWA.

NUT-LOCK.

SPECIFICATION forming part of Letters Patent No. 282,688, dated August 7, 1883.

Application filed June 16, 1883. (No model.)

*To all whom it may concern:*

Be it known that I, MARSHALL TURLEY, of Council Bluffs, in the county of Pottawattamie and State of Iowa, have invented certain new and useful Improvements in Nut-Locks; and I do hereby declare the following to be a full, clear, and exact description of the invention, such as will enable others skilled in the art to which it appertains to make and use the same.

My invention relates to nut-locks, the object being to provide a bolt and nuts of such construction as to insure an absolutely secure connection between them, to strengthen the fastening by relieving the bolt of a portion of its tension, and to securely lock the nuts against accidental displacement.

The invention consists in the features of construction and combinations of parts hereinafter fully described, and pointed out in the claims.

Figure 1:
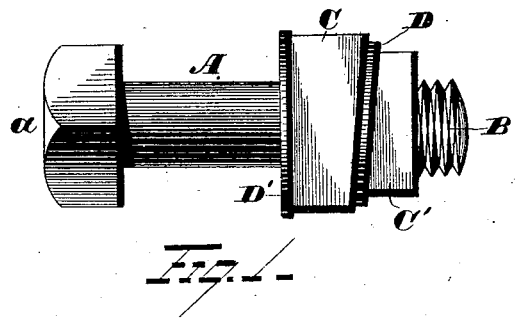
Figure 2:
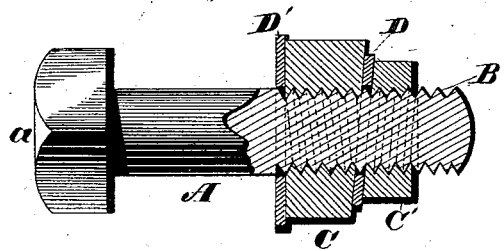
Figure 3:
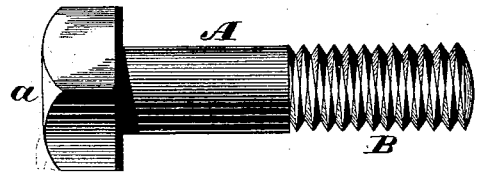

In the drawings, Figure 1 represents a side elevation of my improvement. Fig. 2 is a longitudinal section of the same, and Fig. 3 an enlarged view of the bolt.

A represents a screw-bolt, formed with a head, a, and a double right and left hand screw-thread, B, each convolution of the same being twisted or spiral to adapt the screw for both a right and left handed nut.

C C' represent, respectively, a right and a left handed nut, whose meeting faces are beveled.

D represents a washer of emery-cloth or equivalent hard material, adapted to be interposed between the beveled faces of the nuts C and C'. A similar washer, D', is interposed between the inner nut, C, and the surface of the object through which the bolt passes.

The construction of the thread thus described adapts the nuts to turn at the same time in opposite directions, thus enabling the latter to be brought together and secured at any desired point on the bolt.

The interposition of the washer of emery-cloth or other material harder than iron serves to effectually exclude air from between the nuts, and affords a close connection or adherence of the same, almost equal to welding, and prevents their movement by jarring.

By the employment of the two nuts with beveled adjacent faces the nuts are retained against rotary displacement for the following reasons: one side or half of each nut is insured a greater frictional contact with the threads of the bolt than its other side, because the face of the nut being beveled, one side is of greater thickness than the other. Hence it is that the unequal frictional contact of the opposite sides of the nut with the bolt tends to retain it against displacement.

Having fully described my invention, what I claim as new, and desire to secure by Letters Patent, is—

1. In a nut-lock, the combination, with a double screw-threaded bolt, of two right and left handed nuts having beveled adjacent faces, substantially as set forth.

2. In a nut-lock, the combination, with a double screw-threaded bolt, of two right and left handed nuts, having beveled adjacent faces, and an interposed roughened washer, substantially as set forth.

In testimony whereof I have signed this specification in the presence of two subscribing witnesses.

MARSHALL TURLEY.

Witnesses:
J. W. CHAPMAN,
C. S. LEFFERTS.